(12) United States Patent
Rezaei (10) Patent No.: US 12,546,396 B2
(45) Date of Patent: Feb. 10, 2026

(54) VARIABLE CONTROL ORIFICE VALVE

(71) Applicant: Compart Systems Pte. Ltd., Singapore (SG)

(72) Inventor: Frederick Rezaei, Phoenix, AZ (US)

(73) Assignee: Compart Systems Pte. Ltd., Singapore (SG)

( * ) Notice: Subject to any disclaimer, the term of this patent is extended or adjusted under 35 U.S.C. 154(b) by 0 days.

(21) Appl. No.: 17/730,879

(22) Filed: Apr. 27, 2022

(65) Prior Publication Data

US 2022/0325807 A1     Oct. 13, 2022

Related U.S. Application Data

(63) Continuation of application No. 16/420,084, filed on May 22, 2019, now Pat. No. 11,346,452.

(60) Provisional application No. 62/674,689, filed on May 22, 2018, provisional application No. 62/674,695, filed on May 22, 2018, provisional application No. 62/674,707, filed on May 22, 2018.

(51) Int. Cl.
  *F16K 1/36* (2006.01)
  *F16K 1/38* (2006.01)
  *F16K 41/10* (2006.01)
  *F16K 41/12* (2006.01)

(52) U.S. Cl.
  CPC .............. *F16K 1/36* (2013.01); *F16K 1/385* (2013.01); *F16K 41/10* (2013.01); *F16K 41/12* (2013.01)

(58) Field of Classification Search
  CPC ... F16K 1/36; F16K 1/385; F16K 1/54; F16K 41/10; F16K 41/12; F16K 3/262
  See application file for complete search history.

(56) References Cited

U.S. PATENT DOCUMENTS

| | | | |
|---|---|---|---|
| 2,019,257 A | 10/1935 | Gibbs | |
| 2,271,785 A | 2/1942 | Watkins | |
| 2,406,099 A | * 8/1946 | Penick | F16K 3/186 |
| | | | 251/190 |
| 3,946,756 A | 3/1976 | Specht | |

(Continued)

FOREIGN PATENT DOCUMENTS

| | | | |
|---|---|---|---|
| CN | 104540774 A | 4/2015 | |
| FR | 2219352 A | * 10/1974 | B01D 25/302 |

(Continued)

OTHER PUBLICATIONS

Translation of FR 2219352 A (Year: 2022).*

*Primary Examiner* — Kelsey E Cary (74) *Attorney, Agent, or Firm* — Dykema Gossett PLLC (57) ABSTRACT

An apparatus for controlling flow through a flow body comprising an intake opening and an output opening in the flow body, a cavity with a first cross-sectional shape and an opening, a diaphragm or a bellows, wherein the diaphragm or the bellows seals the opening of the cavity and the diaphragm or the bellows includes a hole, a plunger with the cross-sectional shape corresponding to the cavity, wherein the plunger is longitudinally movable within the cavity and a plunger portion forms an orifice with cavity portion, and a rod coupled with the plunger for facilitating the longitudinal movement of the plunger, wherein the rod comprises a rod cross section that corresponds to the hole in the diaphragm or the bellows.

21 Claims, 12 Drawing Sheets

(56) References Cited

U.S. PATENT DOCUMENTS

| | | | | |
|---|---|---|---|---|
| 4,030,695 A | * | 6/1977 | Curtis | A01M 13/00 137/614.19 |
| 4,250,914 A | | 2/1981 | Ferrentino | |
| 4,462,568 A | | 7/1984 | Taylor et al. | |
| 5,421,547 A | | 6/1995 | Phillips | |
| 5,743,513 A | * | 4/1998 | Yoshikawa | F16K 41/12 251/335.1 |
| 2003/0010953 A1 | * | 1/2003 | Coppock | F16K 3/22 137/15.08 |
| 2005/0258390 A1 | | 11/2005 | Stier et al. | |
| 2007/0170389 A1 | | 7/2007 | Koizumi | |
| 2008/0099081 A1 | | 5/2008 | Yamamoto | |
| 2010/0001222 A1 | * | 1/2010 | Muzzo | F16K 1/02 251/328 |
| 2014/0183393 A1 | | 7/2014 | Hunter et al. | |
| 2014/0209827 A1 | | 7/2014 | Kung | |
| 2015/0041691 A1 | * | 2/2015 | Buhler | F16K 7/126 251/129.01 |
| 2015/0316168 A1 | | 11/2015 | Lv | |
| 2015/0362079 A1 | | 12/2015 | Nguyen et al. | |
| 2016/0195190 A1 | | 7/2016 | Nguyen | |

FOREIGN PATENT DOCUMENTS

| | | |
|---|---|---|
| FR | 2593880 A1 | 8/1987 |
| GB | 2147051 A | 5/1985 |
| JP | S52-039828 | 3/1977 |
| JP | S57-076380 | 5/1982 |
| JP | S63-129781 U | 8/1988 |
| JP | H04-106578 | 9/1992 |
| JP | 2010-505073 | 2/2010 |
| JP | 2010101367 A | 5/2010 |
| JP | 2016-505777 A | 2/2016 |
| JP | 2017-506198 A | 3/2017 |
| JP | 2021-526622 A | 10/2021 |
| KR | 10-2009-0057312 A | 6/2009 |
| KR | 10-2015-0095754 A | 8/2015 |
| WO | 00/14614 A1 | 3/2000 |
| WO | 2017007888 A1 | 1/2017 |
| WO | 2018222971 A1 | 12/2018 |

* cited by examiner

VARIABLE CONTROL ORIFICE VALVE

CROSS-REFERENCE TO RELATED APPLICATIONS

This application is a continuation of U.S. application Ser. No. 16/420,084 (the '084 application), filed 22 May 2019, which claims the benefits of U.S. provisional application No. 62/674,689 (the '689 application), filed 22 May 2018; U.S. provisional application No. 62/674,695 (the '695 application), filed 22 May 2018; and U.S. provisional application No. 62/674,707 (the '707 application), filed 22 May 2018. The '689 application; the '695 application; and the '707 application are all hereby incorporated by reference as though fully set forth herein.

FIELD OF THE DISCLOSURE

The present disclosure provides a means to control and regulate the flow of gas and fluid by means of an adjustable orifice More particularly, the present disclosure addresses the shortcomings of current methods used to adjust or maintain the flow path of gas and fluid, regardless of pressure, to provide desired results.

BACKGROUND

In almost all markets that require precision in regard to the flow of gas and fluid, the processes demand accurate control and handling of the substances used. In order for the downstream process to deposit, mix, and create a final product as needed to meet user requirements, the gas and fluid involved must be precisely controlled. Currently, in situations which require larger sized application of the flow of gas and fluid, like oil and gas applications, there is enough room to allow elaborate and complex system to control the flow through adjustable orifices (automatic, semiautomatic and manual). Additionally, the controlled flow of hazardous and toxic gases and fluids makes it imperative the system containing these substances is leakproof under any circumstances. When the system reduces to smaller than 3 inches in diameter, especially sub 2000 micron diameters and sub 100 micron diameters, the size limitations make it much more difficult to create leak-proof systems, such as an adjustable orifice system, to control the flow of gases and liquids.

An objective of the present disclosure is to provide a leak-proof system to enable precise control of the flow of fluid and gases especially from orifices smaller than 3 inches in diameter down to a micron diameter opening.

BRIEF SUMMARY

The instant disclosure, in at least one embodiment, comprises an intake opening and an output opening in the flow body, a cavity with a first cross-sectional shape and an opening, a diaphragm or a bellows, wherein the diaphragm or the bellows seals the opening of the cavity and the diaphragm or the bellows includes a hole, a plunger with a second cross-sectional shape corresponding to the first cross-sectional shape of the cavity, wherein the plunger is longitudinally movable within the cavity and a plunger portion forms an orifice with a cavity portion, and a rod coupled with the plunger for facilitating the longitudinal movement of the plunger, wherein the rod comprises a rod cross section that corresponds to the hole in the diaphragm or the bellows.

DETAILED DESCRIPTION OF EMBODIMENTS

The present disclosure provides a solution to deficiencies in the design and implementation of flow control systems when size of the flow path is reduced for flow lines below 3 inches and in micron size diameter flow path. In addition, the present disclosure provides a means by which corrosive, toxic, and hazardous gases and fluids can move and be fully sealed from the outside environment. The present disclosure also implements a means of controlling the flow path of gases and fluids outside of the sealed body in which they travel.

The adjustable orifice can also be used in large scale system which allow for more elaborate drive mechanisms.

The embodiments described herein enable the user to change the orifice size without shutting the system down, opening a flow path in the flow control system, or changing the physical orifice. This can reduce the changeover time while enabling the system to accommodate adjustments to the orifice and to accommodate drops in pressure levels (i.e., drop in vacuum) within the flow path while providing constant flow characteristics in the flow path.

The present disclosure uses actuation of a rod from outside the flow body by means of a diaphragm or bellows to enable actuation to perform adjustments of the orifice within the flow path body. The diaphragm or bellows can be comprised of non-metal, metal, or a combination of metal and non-metal that is able to flex without allowing access to outside of the bounds of the flow path. The metal or non-metal diaphragm or bellows can be welded to the flow path body to completely protect the flow path from interacting with the outside environment (i.e., outside of the flow path). In the instance of other critical applications, such as those in semiconductor systems, metal seals can be used between the diaphragm or bellows and body and compressed by a specifically designed bolt or compression bracket.

To enable changes in size of the orifice, the rod and actuation apparatus connected to the diaphragm or bellows is used to move in front of the flow path. The rod or apparatus can have a pointed shape to control the flow characteristic with a sealed surface on the top of the pointed feature. The entrance of gas and fluid will be at the lower portion of the geometry and the exit would be at upper part of the geometry past the sealed area. As the apparatus lowers it will reduce the gas or fluid flow because the distance between the walls and pointed geometry will close and thus reduce the flow. This configuration can provide a better seal in applications where gas and vacuum are used downstream from the orifice. The pointed shape or perradius can be made from seal material (e.g., metal, most plastic and rubber material, PTFE, EPTFE, Nylon, PVC, PVDF, PP, NBR, FKM, and EPDM. As the apparatus continues to lower, the flow reduces until the seal surface of the plunger or apparatus meets the seal surface of the body, and as a result completely shuts off the flow. The seal surface can be made from material that includes but is not limited to: metal, most plastic and rubber material, PTFE, EPTFE, Nylon, PVC, PVDF, PP, NBR, FKM, and EPDM. The body seal surface can be smooth, ridged, or have a raised bump to improve the seal function. When the seal surface comes in contact with the surface of the walls of the flow body, it can completely close the flow against the out-flow port of the gas or fluid. On the downstream side of the flow, an accurate raised ring at the opening of exit port and entrance port can help the valve to seal against the body. The flow body can be made of any suitable material for the gases and fluids going through the flow body, including, for example, stainless steel, polymer, or other metals.

In some embodiments, a positive pressure in the cavity can cause the diaphragm or the bellows to be in a first position (e.g., exerting a force on the diaphragm or bellows away from the orifice/flow path) and the drive mechanism can be used to move the orifice actuation mechanism inside the enclosure to a "closed" or "more closed" position.

Figure 1A:
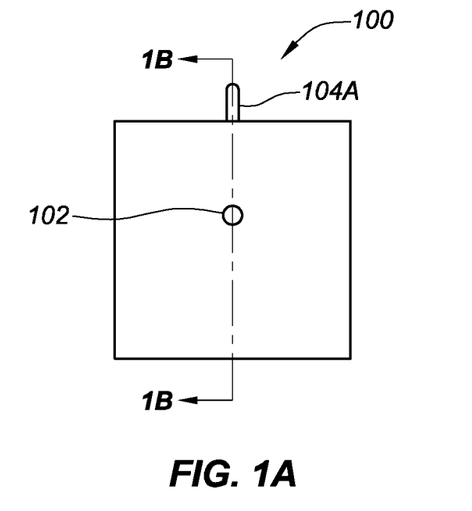
FIG. 1A is a side view of a flow body with an intake opening and a rod, consistent with embodiments in the present disclosure.

FIG. 1A is a side view of a flow body 100 with an intake opening 102 and a rod 104 coupled with a plunger 106 in a cavity of the flow body 100.

Figure 1B:
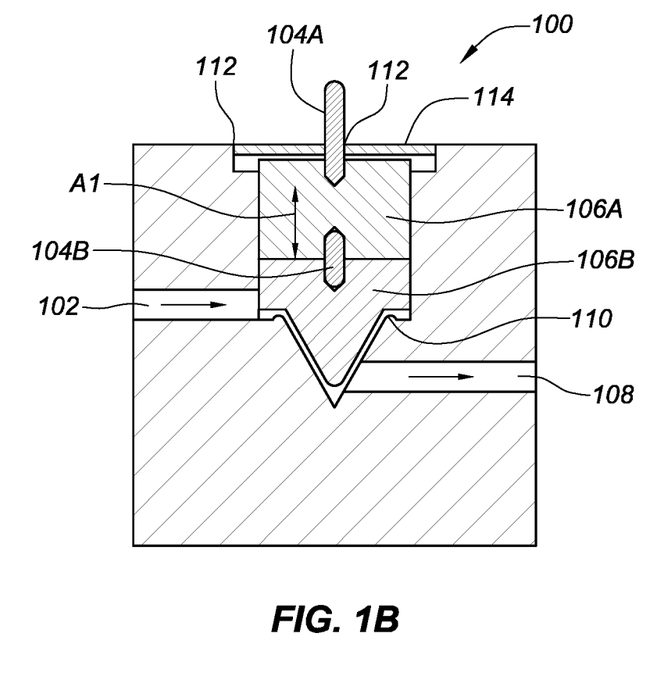
FIG. 1B is a cross-sectional view A-A of FIG. 1A showing a flow path into the flow body past a plunger and a flow path out of the flow body, consistent with embodiments in the present disclosure.

FIG. 1B is a cross-sectional view A-A of FIG. 1A showing a flow path into the intake opening 102 into the flow body 100 past the plunger 106A and plunger tip 106B in a cavity of the flow body and where the flow path continues out of the flow body through an output opening 108. The plunger 106A can be coupled with the rod 104A used to move the plunger 106A and the plunger tip 106B (with another piece of rod 104B coupling plunger 106A with the plunger tip 106B) along an axis indicated by arrow A1. The rod 104A can be coupled with an actuator (not shown in FIGS. 1A-B). The plunger tip 106B can contact a sealing surface 110 integral to the flow body. The plunger can also include a welded portion 112 (i.e., a weld) and a diaphragm 114. The weld 112 can couple the rod 104A to the diaphragm 114. The weld 112 can also couple the diaphragm 114 to the flow body (e.g., a weld around a circumference/edge of the diaphragm 114). In some embodiments (not shown) the plunger 106A and the plunger tip 106B can be a single element. In some embodiments, the rod 104 can be coupled to the diaphragm 114 using other methods, such as, a threaded connection, an adhesive connection, or other suitable connection method.

Figure 1C:
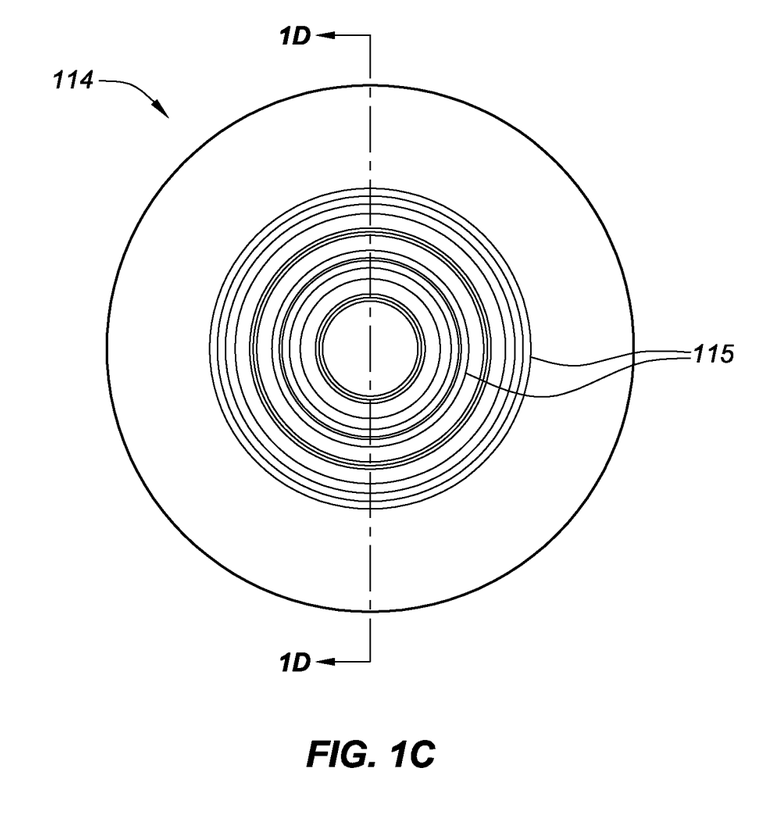
FIG. 1C is a top view of a diaphragm that includes ridges, consistent with embodiments in the present disclosure.

The sealing surface 110 shown in FIG. 1A can be also be referred to as a "bump" seal, or a "knife edge" seal. The bump seal can refer to various configurations of the sealing surface 110, including a rounded cross-sectional shape (as shown in FIG. 1A). The knife edge seal can refer to other configurations of the sealing surface 110 where the cross-sectional shape is more pointed (e.g., triangular; comes to a more defined point/edge like a knife). When the diaphragm 114 moves, the plunger 106A and the plunger tip 106B can also move (e.g., longitudinally in the direction indicated by arrow A1), to create a seal with the sealing surface 110, the plunger tip 106B can contact the sealing surface 110. The plunger tip 106B can deform to conform to the profile of the sealing surface 112 (as shown in FIG. 1C) to block the flow path from the intake opening 102 to the output opening 108. The sealing surface 110 can be made from the same material as the plunger tip 106B or different material than plunger tip 106B. The sealing surface 110 can also be one element if the sealing surface 110 is not made from same material as the plunger tip 106B.

Figure 1D:
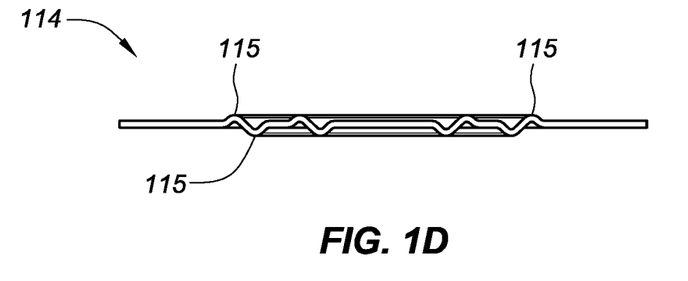
FIG. 1D is a cross-sectional view of the diaphragm of FIG. 1C, consistent with embodiments in the present disclosure.

The diaphragm 114 can move by flexing of the material due to material properties or a physical configuration of the diaphragm. For example, the diaphragm 114 can include one or more ridges 115, shown in FIG. 1C, a top view of the diaphragm 114, that allow for additional flexing (i.e., movement) of the diaphragm. FIG. 1D is a cross-sectional view of the diaphragm of FIG. 1C at A-A also showing the ridges 115. The ridges 115 can be located on both sides of the diaphragm (shown in FIGS. 1C-D), on only one side of the diaphragm (not shown), or only on another side of the diaphragm (not shown). The movement of the diaphragm can be used to move the rod 104A. The diaphragm shown in FIG. 1C can also include a hole for the rod 104A to pass through. Other embodiments (not shown) of the diaphragm could omit the hole, and two different rods 104 could be coupled with the diaphragm—one rod on one side of the diaphragm for coupling with a drive mechanism and another rod on the opposite side of the diaphragm for coupling with the plunger 106. The rods could be coupled with the diaphragm through any suitable method including welding.

The intake opening 102 and the output opening 108 can be offset (i.e., not in line) to minimize the amount of travel needed by the plunger 106 to vary the setting for different flow rates through the flow path. Offsetting the intake opening 102 and the output opening 108 can be beneficial with regards to how the system is pressurized and where a vacuum may be occurring. For example, if a vacuum exists proximate the output opening 108, then having the output opening 108 lower than the intake opening 102 (as shown in FIG. 1B) can assist with maintaining a desired pressure of the system proximate the plunger 106. In another embodiment (not shown), where a vacuum exists proximate the intake opening 102, having the intake opening lower than the output opening can be beneficial.

As shown in FIG. 1B, the portion of the plunger 106 furthest from the rod 104 can have a tip that is, for example, triangular and the cavity portion proximate the tip can correspond in shape to the tip shape. Other shapes are possible for the tip of the plunger (e.g., square, rounded, etc.)

Figure 1E:
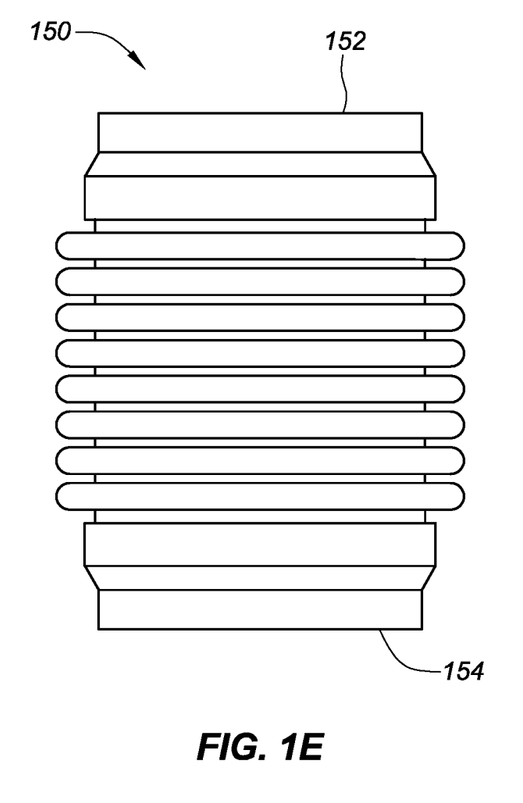
FIG. 1E is a side view of a bellows, consistent with embodiments in the present disclosure.

FIG. 1E is a side view of a bellows, consistent with embodiments in the present disclosure. For embodiments where more travel of the plunger 106 is needed, a bellows 150 can be used instead of a diaphragm 114. The bellows can be configured, through its shape and structure, to allow for expansion and contraction from a first shape to a second shape, where the change from the first shape to the second shape can result in a change in distance between a first bellows end 152 and a second bellows end 154. The change in distance can be used to move a plunger (e.g., plunger 106) in a longitudinal direction. The bellows 150 can be a thicker element in relation to the diaphragm 114 and can include a series of ridged portions that allow the bellows 150 to expand and contract a greater amount (e.g., a greater amount of longitudinal travel) compared to the diaphragm 114. The bellows 150 can be made from metal, polymer, a combination of the two, or any suitable material that allows for the desired compressibility/expansion.

Figure 1F:
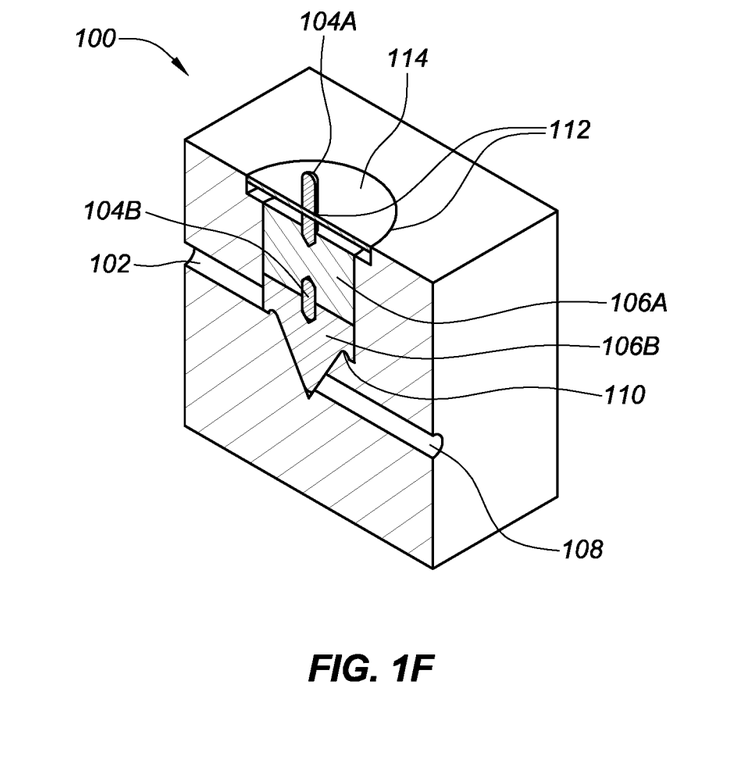
FIG. 1F is an isometric cross-sectional view off the flow body of FIGS. 1A-B, consistent with embodiments in the present disclosure.

FIG. 1F is an isometric cross-sectional view of the flow body 100 of FIGS. 1A-B, including the intake opening 102, the rod 104, the plunger 106 in a cavity of the flow body 100, the output opening 108, the sealing surface 110, and the weld 112 coupling the rod 104 to the diaphragm 114.

An embodiment of the present disclosure enables the adjustment of the flow path with drive mechanisms like a linear motor, a servo motor, a pneumatic device, a piezoelectric motor and similar actuation devices, which can be connected to the outside part of the diaphragm or bellows to enable the movement of orifice actuation mechanism inside of the enclosure (e.g., the cavity of the flow body).

Another embodiment of the present disclosure includes an option for a step movement adjustable orifice. For this option, the user may select the location of the rod and move it to a preset and calibrated location and move from one orifice size to another and enable the switching of the system between different flow characteristics. The set point can be manually adjusted using a screw or accurate positioning dial (or other similar mechanism and/or method) to push and pull on the diaphragm or bellows until the desired set point is achieved for the orifice. This switching can be accomplished by using pneumatic, magnetic, and/or motorized driven actuators. This method can reduce the cost of the drive system.

Still another embodiment of the present disclosure includes the option for a manually adjustable orifice mechanism. For this option, the user may manually move the location of the rod and in turn change the orifice size to the desired flow set point. This method reduces the cost of the drive system while eliminating the need to disassemble the body in order to change the physical orifice and flow characteristics.

Figure 2A:
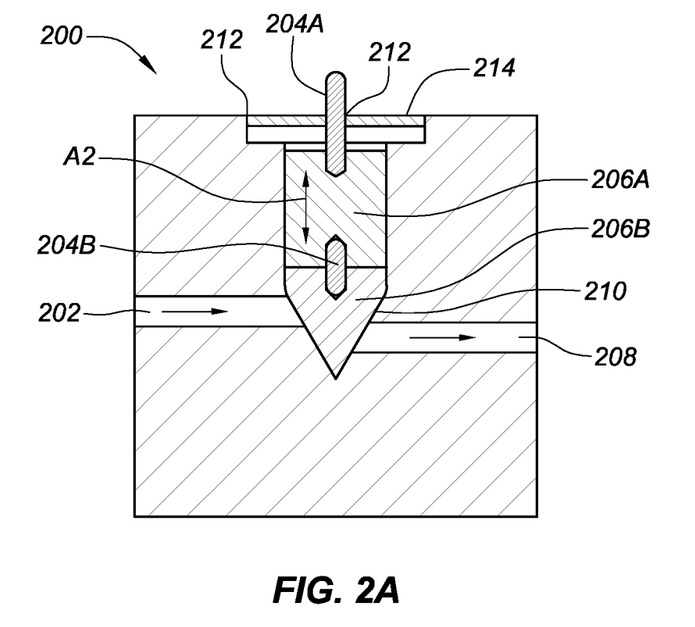
FIG. 2A is a cross-sectional view of a flow body showing a flow path into the flow body past a plunger and a flow path out of the flow body, consistent with embodiments in the present disclosure.

FIG. 2A is a cross-sectional view of a flow body showing a flow path through an intake opening 202 into the flow body 200 past a plunger tip 206B in a cavity of the flow body 200 and a flow path out of the flow body 200 through an output opening 208. The plunger 206A can be coupled with the rod 204A used to move the plunger 206A and the plunger tip 206B (with another piece of rod 204B coupling plunger 206A with the plunger tip 206B) along an axis indicated by arrow A2. The rod 204A can be coupled with an actuator (not shown in FIGS. 2A-B). The plunger tip 206B can contact a sealing surface 210 integral to the flow body. The plunger can also include a welded portion 212 (i.e., a weld) and a diaphragm 214. The weld 212 can couple the rod 204 to the diaphragm 214. In some embodiments (not shown) the plunger 206A and the plunger tip 206B can be a single element.

The plunger 206 can be made from any suitable material, including stainless steel, PTFE, or other suitable materials.

Figure 2B:
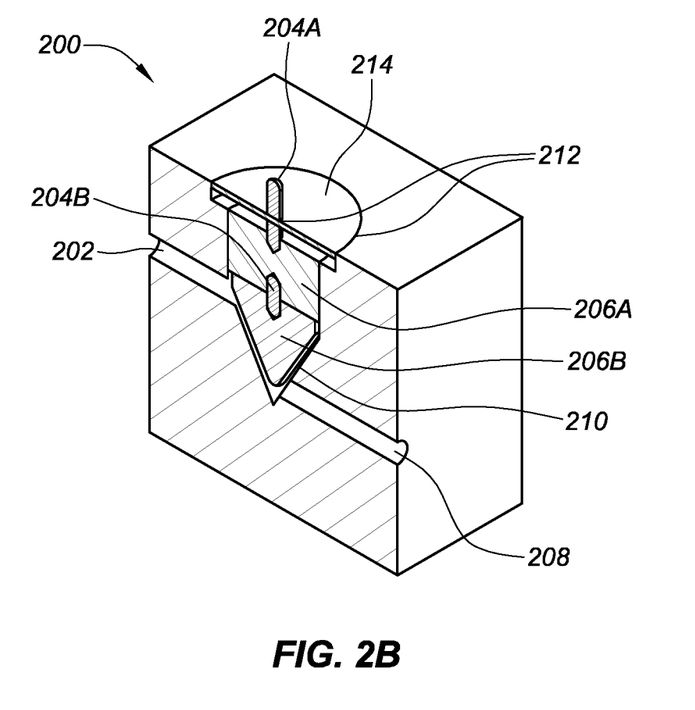
FIG. 2B is an isometric cross-sectional view off the flow body of FIG. 1A, consistent with embodiments in the present disclosure.

FIG. 2B is an isometric cross-sectional view of the flow body of FIG. 2A, including the intake opening 202, the rod 204, the plunger 206 in a cavity of the flow body 200, the output opening 208, the sealing surface 210, and the weld 212 coupling the rod 204 to the diaphragm 214. The sealing surface 210 can be made from the same material as the plunger tip 206B a or different material than plunger tip 206B. The sealing surface 210 can also be one element if the sealing surface 210 is not made from same material as the plunger tip 206B.

The embodiment shown in FIGS. 2A-B differs from the embodiment shown in FIG. 1B by, for example, not including the bump seal feature on the flow body proximate the plunger. In FIGS. 2A-B the plunger does not include a portion that deforms when contacting the bump seal. Instead, a portion of the plunger 106 contacts a portion of the flow body 200, as shown in FIGS. 2A-B and blocks the flow path from the intake opening 202 to the output opening 208.

To calibrate the two-flow characteristic, a moldbluc or other flow measurement devices can be used to achieve the set point location for the plunger. The set points can be manually adjusted until the desired set point is achieved.

Figure 3A:
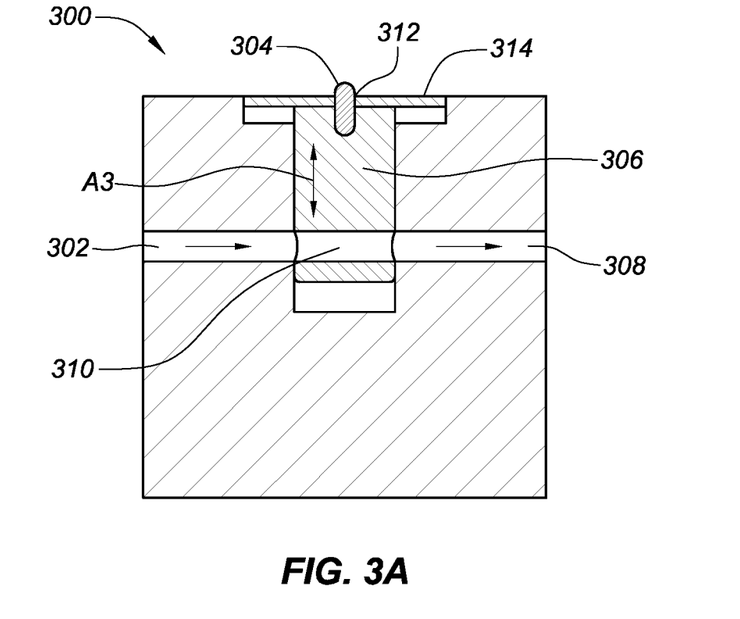
FIG. 3A is a cross-sectional view of a flow body showing a flow path into the flow body through an opening in a plunger and a flow path out of the flow body, consistent with embodiments in the present disclosure.

FIG. 3A is a cross-sectional view of a flow body 300 showing a flow path into the intake opening 302 into the flow body 300 past a plunger 306 in a cavity of the flow body 300 and where the flow path continues out of the flow body through an output opening 308. The plunger 306 can be coupled with a rod 304 used to move the plunger 306 along an axis indicated by arrow A3. The rod 304 can be coupled with an actuator (not shown in FIGS. 3A-B). The plunger 306 can contact a sealing surface 310 integral to the flow body. The plunger can also include a welded portion 312 (i.e., a weld) and a diaphragm 314. The weld 312 can couple the rod 304 to the diaphragm 314.

The intake opening 302 and the output opening 308 can be in line (i.e., linear) to facilitate adjustment of the flow rates through the flow path using the longitudinal movement of the plunger 306. As shown in FIG. 3A, the portion of the plunger 306 furthest from the rod 304 can have a tip that is, for example, rectangular and the cavity portion proximate the tip can correspond in shape to the tip shape. Other shapes are possible for the tip of the plunger (e.g., square, rounded, etc.)

Figure 3B:
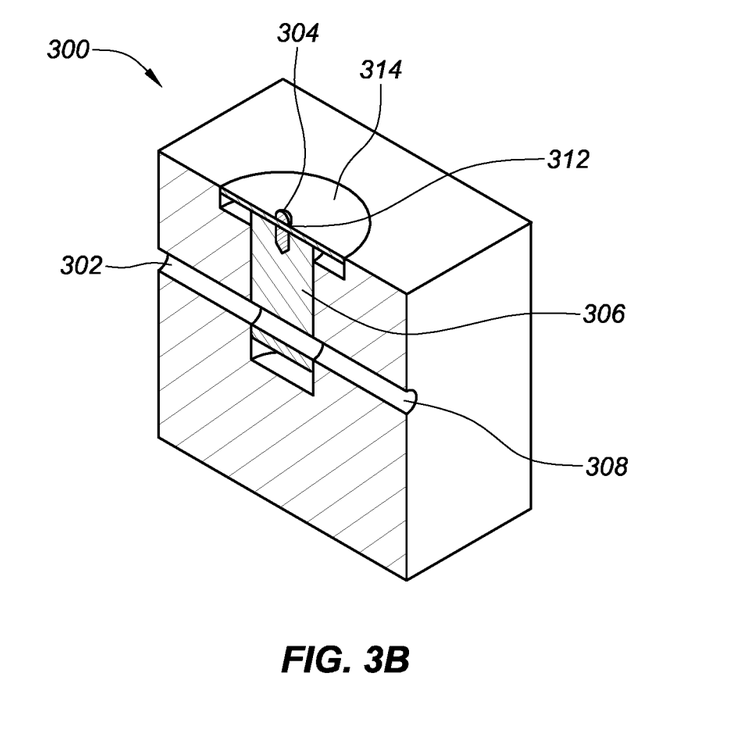
FIG. 3B is an isometric cross-sectional view off the flow body of FIG. 7A.

FIG. 3B is an isometric cross-sectional view off the flow body of FIG. 3A, including the intake opening 302, the rod 304, the plunger 306 in a cavity of the flow body 300, the output opening 308, the sealing surface 310, and the weld 312 coupling the rod 304 to the diaphragm 314. One embodiment of the present disclosure provides an adjustable orifice. This embodiment can use the plunger (through the movement of the rod) to block the flow path using a number of options depending on the application, fluid or gas type and the pressurized system or pressure with downstream vacuum application.

One embodiment of the present disclosure can use a diaphragm or bellows to seal the outside of the body from inside while enabling the movement from the outside of the body to be transmitted to inside of the flow body.

Another embodiment of this disclosure uses welding to weld the diaphragm or bellows to the body and prevent flammable, corrosive, toxic, and hazardous gases and fluids from leaking outside of the flow body.

Figure 4:
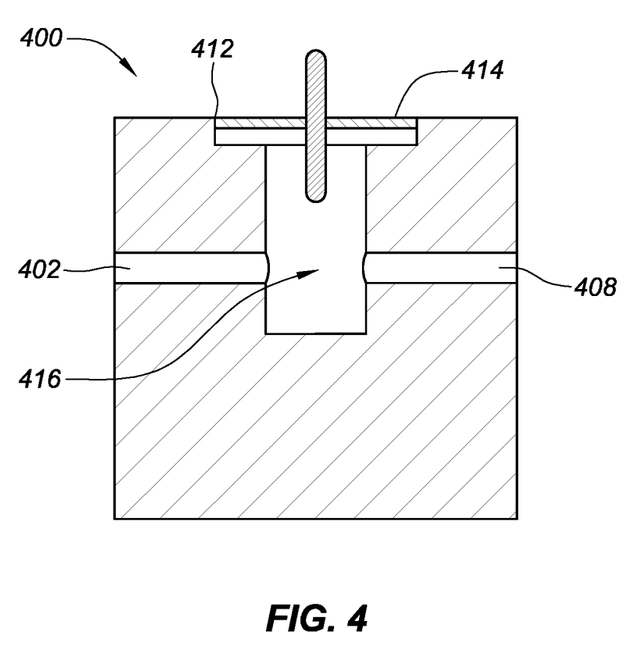
FIG. 4 is a cross-sectional view of a flow body with a diaphragm or bellows coupled to the flow body (e.g., welded), consistent with embodiments in the present disclosure.

FIG. 4 is a cross-sectional view of a flow body 400 with a cavity 416 of the flow body 400, a diaphragm 414 or bellows (not shown, e.g., bellows 150) coupled to the flow body 400 (e.g., via weld 412). The diaphragm 414 can couple with, for example, a plunger (not shown in FIG. 4). The flow body can comprise an intake opening 402 and an output opening 408. Movement of the diaphragm (by direct contact with the diaphragm) can be translated to the plunger (not shown) as described herein to adjust the flow path through the flow body.

Another embodiment of the present disclosure uses a seal to fit the diaphragm or bellows and body by using a specially designed bolt with an opening in the center or a bracket which provides access to the center. The seal is made from material that includes but is not limited to: metal, most plastics and rubber material, PTFE, EPTFE, Nylon, PVC, PVDF, PP, NBR, FKM, and EPDM.

Figure 5A:
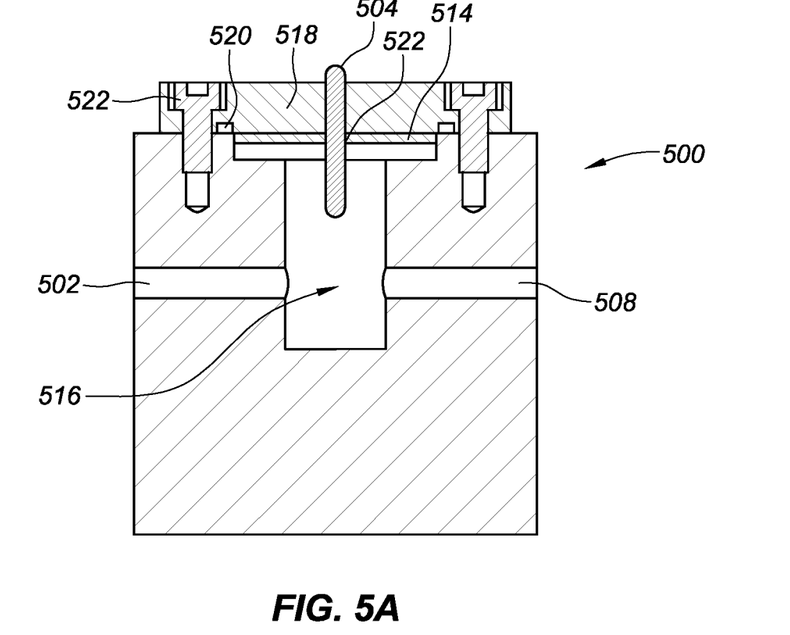
FIG. 5A is a cross-sectional view of a flow body with a cap and a seal, where the cap is coupled with the flow body by a plurality of fasteners and the seal is compressed between the cap and the flow body, consistent with embodiments in the present disclosure.

FIG. 5A is a cross-sectional view of a flow body 500 with a cap 518 and a seal 520, where the cap 518 is coupled with the flow body by a plurality of fasteners 522 and the seal 520 is compressed between the cap 518 and the flow body 500. The cap includes an opening configured to allow a rod 504 to pass through. The rod 504 can couple with, for example, a plunger (not shown in FIG. 5A). The seal 520 can be compressed between the cap 518 and a portion of the flow body 500, where the plurality of fasteners 522 can maintain compression of the seal 520. In some embodiments (not shown) in FIG. 5A, see, e.g., FIGS. 1B and 1E), a bump seal or knife edge seal can be used instead of a seal 520 and the cap 518 can either compress the bump seal or knife edge and/or the cap 518 can deform to conform to the bump seal or knife edge to create a seal when the cap 518 is secured in place by the plurality of fasteners.

Figure 5B:
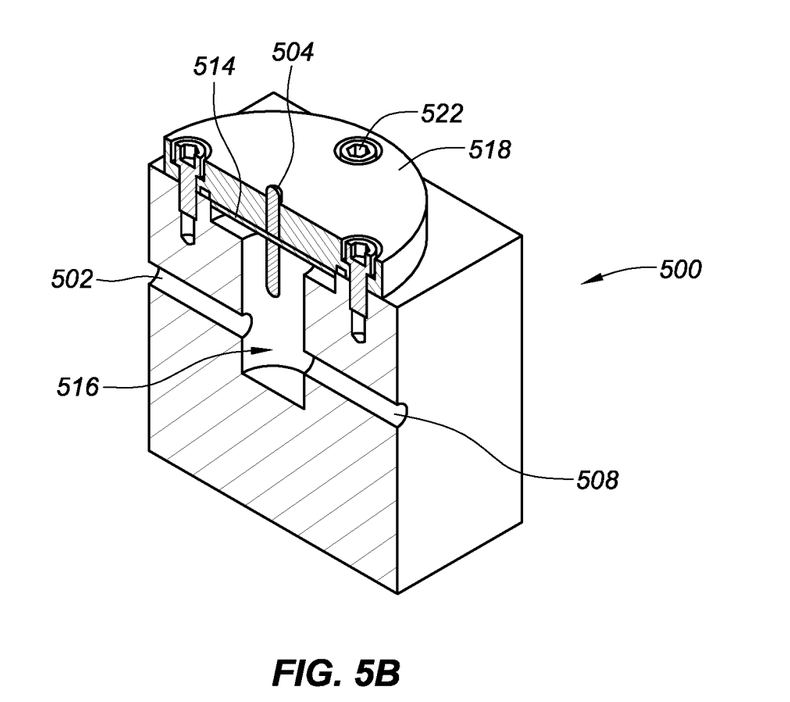
FIG. 5B is an isometric cross-sectional view of the flow body with the cap and the seal of FIG. 4A, consistent with embodiments in the present disclosure.

FIG. 5B is an isometric cross-sectional view of the flow body 500 with the cap 518 and the seal 520 of FIG. 5A. In FIGS. 5A-B, the intake opening 502 and the output opening 508 are shown as being in the same plane and linear. Other embodiments (not shown) can have the intake opening and the output opening offset, nonlinear, or at different angles (e.g., approximately perpendicular).

Another embodiment of the present disclosure seals the diaphragm or bellows to the body using a bump or knife-edged machine on the sealing area of the body. This component allows the diaphragm or bellows to press on and be sealed against the body using a specially designed bolt with an opening in the center or a bracket which provides access to the center.

Another embodiment of the present disclosure uses a drive mechanism device like linear motor, servo motor, pneumatic, piezoelectric motor and similar actuation devices connected to outside part of the diaphragm or bellows to enable the movement of orifice actuation mechanism inside of the enclosure.

Another embodiment of the present disclosure connects a shaft to inside of the diaphragm or bellows to enable movement of it inside the flow body without access to outside of the body. The shaft can, in some embodiments, be coupled (e.g., welded) to a rod (e.g., rod 104). This can be helpful as the thickness of the materials in the diaphragm and/or bellows can be thin and fragile, making welds difficult to execute due to the small amount of material present.

Another embodiment of the present disclosure uses the rod connected to diaphragm or bellows to move the end of the rod in front of the flow path.

Another embodiment of the present disclosure uses a rod or apparatus that has a pointed shape moving toward and away from a similar matching shape on the body to control the flow characteristics.

Another embodiment of the present disclosure uses a pointed matching shape so that the entrance of gas and fluid can be at the upper portion of the geometry with the exit being at the lower part of the geometry past the sealed area. See, e.g., FIGS. 1B and 1F and related discussion for more information.

Another embodiment of the present disclosure uses a pointed apparatus (e.g., the plunger tip 106B) made from seal material including a rubber or polymer, or a metal, or a combination of those materials.

Another embodiment the seal surface can be made from material that includes but is not limited to: metal, most plastics and rubber material, PTFE, EPTFE, Nylon, PVC, PVDF, PP, NBR, FKM, and EPDM.

Another embodiment of the present disclosure uses a raised circular or oval ring at the opening of exit and entrance port to help the valve to seal against the flow body.

Figure 6A:
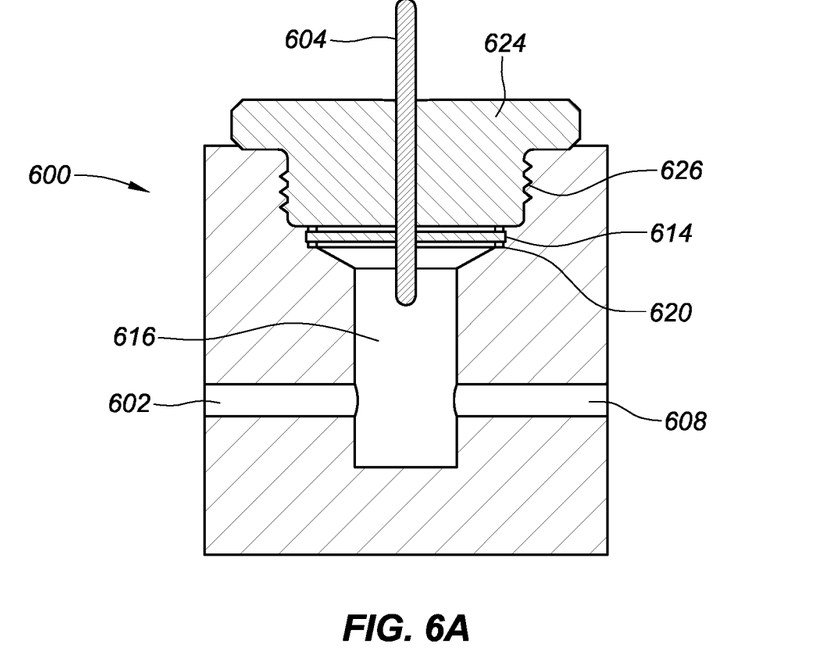
FIG. 6A is a cross-sectional view of a flow body with a bolt and a seal, where the bolt is coupled with the flow body by a threaded connection and the seal is compressed between a portion of the bolt and the flow body, consistent with embodiments in the present disclosure.

FIG. 6A is a cross-sectional view of a flow body 600 with a bolt 624 and a seal 620, where the bolt 624 is coupled with the flow body 600 by a threaded connection and the seal 620 is compressed between a portion of the bolt 624 and a portion of the flow body 600. The bolt 624 can include an opening configured to allow a rod 604 to pass through the bolt 624. The rod 604 can couple with a plunger (not shown) in the cavity 616 of the flow body 600 to facilitate longitudinal movement of the plunger in the cavity 616 to control flow from the intake opening 602 through the cavity 616 to the output opening 608.

The seal 620 can be compressed by a portion of the bolt 624 when the bolt 624 is coupled with the flow body 600. In some embodiments (not shown) in FIG. 6A, see, e.g., FIGS. 1B and 1E), a bump seal or knife edge seal can be used instead of a seal 620 and the bolt 624 can either compress the bump seal or knife edge and/or the bolt 624 can deform to conform to the bump seal or knife edge to create a seal when the bolt 624 is secured in place by the bolt threads coupled with the flow body 600.

Figure 6B:
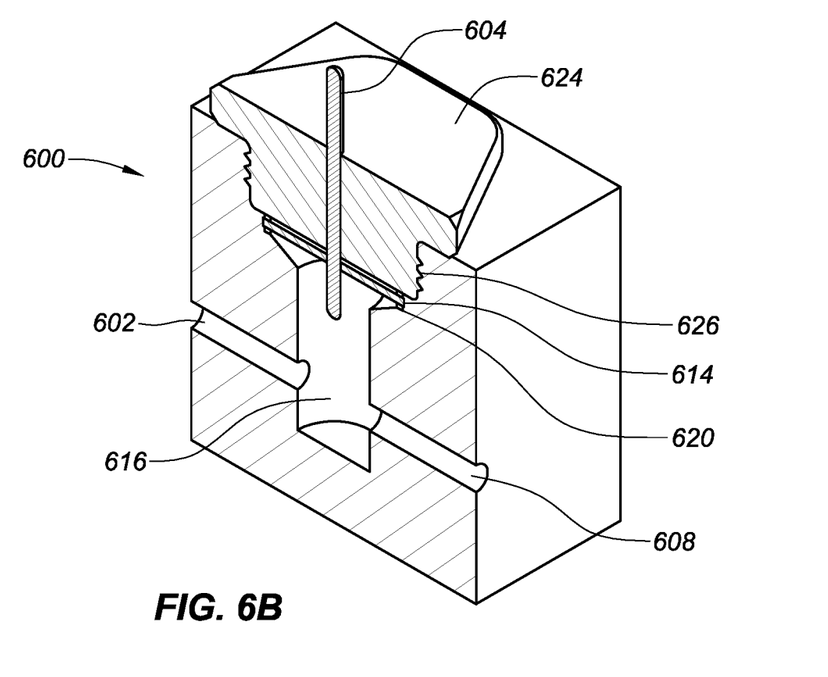
FIG. 6B is an isometric cross-sectional view of the flow body with the bolt and the seal of FIG. 6A, consistent with embodiments in the present disclosure.
Figure 7A:
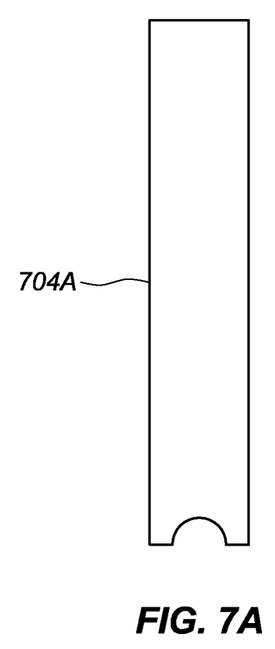
FIGS. 7A-D are side views of an end of the rod showing exemplary opening profiles including portions of an oval portion, a square portion, a triangular portion, and a circular portion, consistent with embodiments in the present disclosure.
Figure 7B:
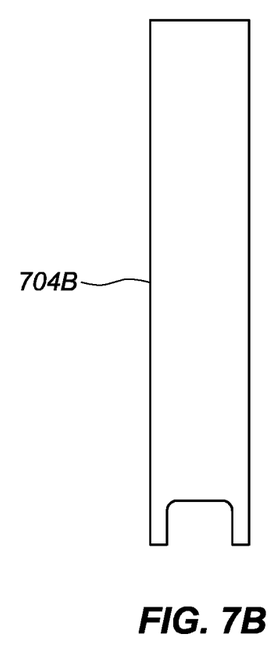
Figure 7C:
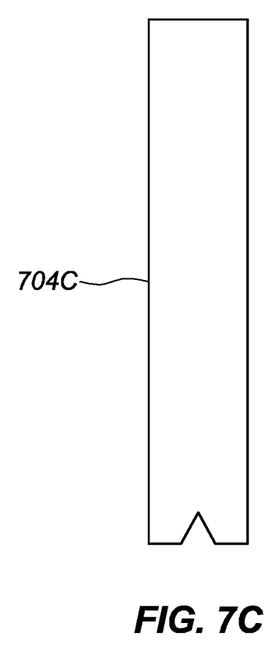
Figure 7D:
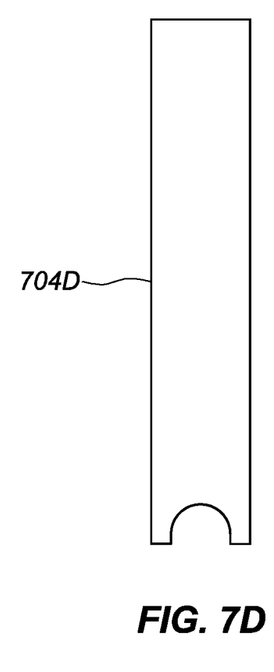
Figure 8A:
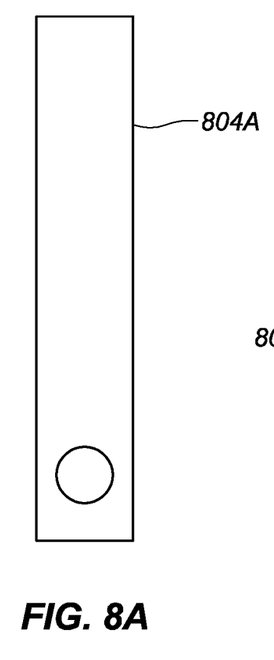
FIGS. 8A-E are side views of an end of the rod showing exemplary partial opening profiles including a circle, a triangular, a pentagon, a hexagonal portion, a polygonal portion, and a rounded rectangle portion, consistent with embodiments in the present disclosure.
Figure 8B:
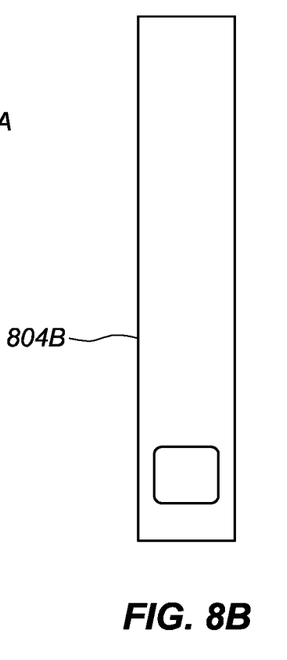
Figure 8C:
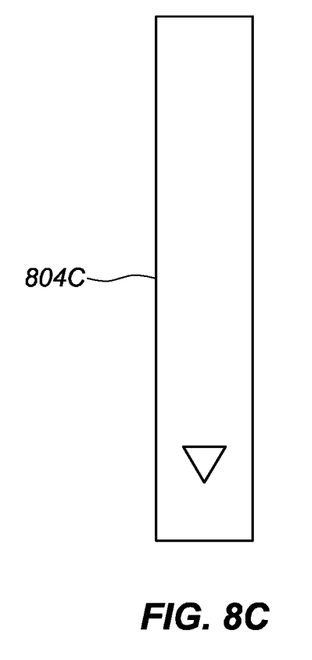
Figure 8D:
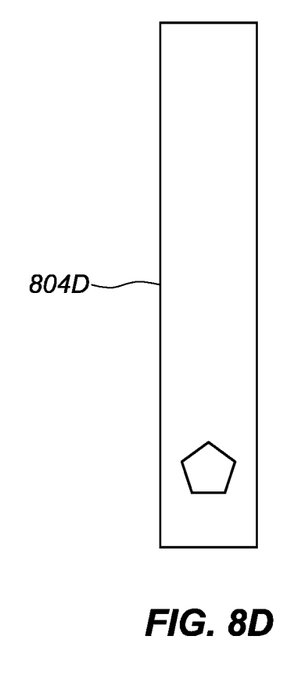
Figure 8E:
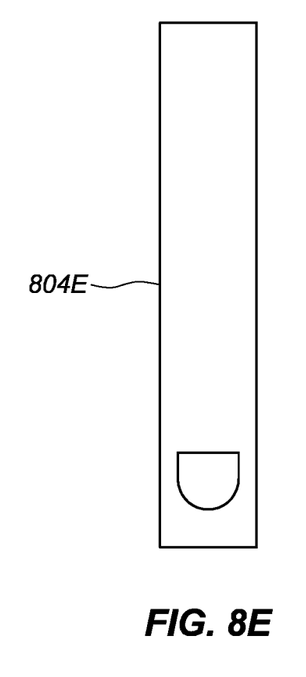

FIG. 6B is an isometric cross-sectional view of the flow body 600 with the bolt 624 and the seal 620 of FIG. 6A.

Another embodiment of the present disclosure seals the diaphragm or bellows (e.g., diaphragm 614) to the flow body (e.g., flow body 600) using a bump or knife-edged machine (not shown in FIGS. 6A-B on the sealing area of the flow body (e.g., flow body 600). This component allows the diaphragm or bellows to be compressed and to be sealed against the flow body 600 using specially designed bolt (e.g., bolt 624) with an opening in the center or a bracket which provides access to the center.

Another embodiment of the present disclosure uses a drive mechanism device like linear motor, servo motor, pneumatic, piezoelectric motor and similar actuation devices connected to outside part of the diaphragm or bellows to enable the movement of orifice actuation mechanism inside of the enclosure.

Another embodiment of the present disclosure connects a shaft to inside of the diaphragm or bellows to enable movement of it inside the body without access to outside of the body.

Another embodiment of the present disclosure uses the rod connected to diaphragm or bellows to move the end of the rod in front of the flow path.

Another embodiment of the present disclosure uses a rod or apparatus that has a pointed shape and sealing surface at the upper part of the pointed surface.

Another embodiment of the present disclosure uses the rod connected to the diaphragm or bellows to move the end of the rod in front of the flow path, with the rod being partially or fully profiled. Different profile shapes can change the flow characteristics (e.g., turbulence, etc.) of the gas or fluid.

Another embodiment of the present disclosure uses a pointed shape for the plunger (e.g., the plunger tip 106B, 206B) where the sealing surface of the plunger (e.g., the plunger tip 106B) can be made from different material (e.g., a rubber or a polymer) than the sealing surface of the flow body. See, e.g., FIGS. 2A-B and related discussion for more information.

Another embodiment of the present disclosure uses a raised ring (not shown) that can be machined on the flow body (e.g., flow body 600) to allow the sealed surface of the pointed apparatus to come in contact with and completely seal the flow path.

In another embodiment of the present disclosure, the seal surface can be made from material that includes but is not limited to: metal, most plastics and rubber material, PTFE, EPTFE, Nylon, PVC, PVDF, PP, NBR, FKM, and EPDM.

FIGS. 7A-D are side views of an end of the rod (e.g., rods 104, 204, 304, 404, 504, and/or 604) showing exemplary opening (i.e., hole) profiles including portions of an oval portion (e.g., FIG. 7, rod 704A), a square portion (FIG. 7, rod 704B), a triangular portion (e.g., FIG. 7, rod 704C), and a circular portion (FIG. 7, rod 704D). Other shapes are possible for the profile. The opening profiles can be the same shape and/or size on both ends of the passage (as viewed from a side cross-sectional view; not shown) or the opening profiles can be different sizes and/or shapes. The opening profile can be located at an end of the rod or at another location of the rod (e.g., proximate the end of the rod). In some embodiments (not shown), the opening can be located at the end of a plunger (e.g., plunger 106, 206, 306, etc.) or at another location of the plunger (e.g., proximate the end of the plunger; see, e.g., FIGS. 8A-E).

Another embodiment of the present disclosure uses a portion of the shaft to block the flow path and adjust the flow characteristics. The hole profile of the opening can include, but is not limited to, a circle, an oval, a triangle, a square, a hexagon, and other similar shapes.

As the rod is moved longitudinally within the cavity, more or less flow can occur from the intake opening (e.g., opening 102, 202, 302, 402, 502, 602) through the cavity (e.g., cavity 116, 216, 316, 416, 516, 616) and out the output opening (e.g., output opening 108, 208, 304B, 408, 508, 608) based on the amount of the opening exposed to the flow path (e.g., the portion of the opening that is not blocked by a portion of the flow body or another element).

FIGS. 8A-E are side views of an end of the rod showing exemplary partial opening profiles including a circle (e.g., FIG. 8, rod 804A, a square (not shown), a triangular (e.g., FIG. 8, rod 804C), a pentagon (e.g., FIG. 8, rod 804D), a hexagonal portion (not shown), a polygonal portion (e.g., FIG. 8, rod 804E), and a rounded rectangle portion (e.g., FIG. 8, rod 804B). The openings can be the same shape and/or size on both ends of the passage (as viewed from a side cross-sectional view (not shown) or the opening profiles can be different sizes and/or shapes.

Another embodiment of the present disclosure uses a partial or full opening that has a varying profile. The opening can go from a small to larger opening or from a larger opening to a smaller opening. For example, the opening can be larger on the intake opening side of the flow body and the opening can be smaller on the output opening side of the flow body, or the opening can be smaller on the intake opening side of the flow body and the opening can be larger on the output opening side of the flow body.

Figure 9A:
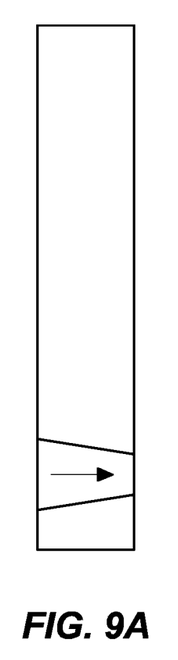
FIGS. 9A-C are cross-sectional views of an end of the rod showing exemplary opening profiles for the passage through the rod. The openings can be various shapes as described above and shown in FIGS. 7A-D and 8A-E, consistent with embodiments in the present disclosure.
Figure 9B:
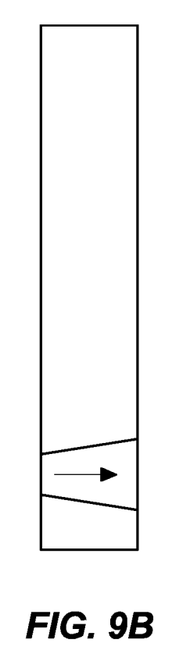
Figure 9C:
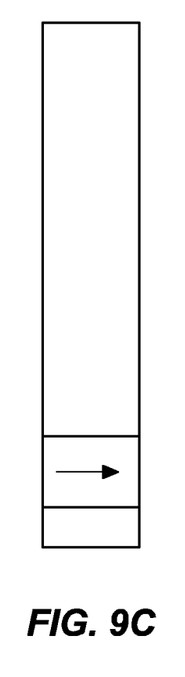

FIGS. 9A-C are cross-sectional views of an end of the rod showing exemplary opening profiles for the passage through the rod. The openings can be various shapes as described above and shown in FIGS. 7A-D and 8A-E. The passage can be tapered larger to smaller along the flow path (e.g., FIG. 9A, where the passage walls are diverging along the flow path), tapered smaller to larger along the flow path (FIG. 9B, where the passage walls are converging along the flow path), and untapered (FIG. 9C, where the passage walls are parallel). The size of the openings of the passages on the output side (closer to the end of the flow arrow in FIGS. 9A-C) can match a desired maximum flow rate of the fluid or gas through the flow body.

The output opening can be sized that allow an upper limit of the flow of gas or fluid (i.e., a maximum flow rate) and actuation of shaft and/or diaphragm or bellows can reduce the flow of the fluid or gas through the flow body, preventing the flow from exceeding the maximum flow rate controlled by the output opening size.

One embodiment of the present disclosure provides an adjustable orifice with varying options dependent on the application and type of fluid or gas, as well as the pressurized system or pressure with downstream vacuum application.

It will be appreciated that details of the foregoing embodiments, given for purposes of illustration, are not to be construed as limiting the scope of the present disclosure. Although several embodiments of the present disclosure has been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure, which is further defined in the converted utility application and appended claims. Further, it is recognized that many embodiments may be conceived that do not achieve all the advantages of some embodiments, particularly preferred embodiments, yet the absence of a particular advantage shall not be construed to necessarily mean that such an embodiment is outside the scope of the present disclosure.

What is claimed is:

1. An apparatus for controlling flow, comprising:
a flow body comprising a cavity, a diaphragm, a plunger, a rod coupled to the plunger, a first sealing surface and a second sealing surface,
wherein the flow body defines the cavity that includes a first cross-sectional shape;
wherein the plunger includes a plunger body and a plunger tip, a base portion of the plunger tip extending from a distal end of the plunger body, wherein the plunger tip is the portion of the plunger furthest from the rod, wherein the plunger body has a first width and the base portion of the tip has a second width, wherein the first width is greater than the second width, thereby defining a stepped plunger portion, a surface of which extends perpendicular to the rod,
wherein the first sealing surface is disposed along the first cross-sectional shape at a bottom of the cavity and extends outward from a central point along an angled profile, wherein the plunger tip is configured to interact with the first sealing surface in a first position and contact the bottom of the cavity thereby blocking a flow path through the flow body, wherein the plunger tip is further configured to contact the central point in the first position, wherein the plunger tip is configured to be spaced from the first sealing surface in a second position thereby opening a flow path through the flow body, between the plunger tip and the bottom of the cavity, wherein a flow path within the cavity is closed when the plunger is in the first position and open when the plunger is in the second position,
wherein the second sealing surface is disposed along the first cross-sectional shape at a stepped portion of the cavity that extends radially outward with respect to a longitudinal axis of the cavity, the second sealing surface being configured to interact with the stepped body portion, and
wherein the stepped plunger portion is configured to interact with the second sealing surface in a first position and contact the stepped body portion thereby blocking the flow path through the flow body, wherein the stepped plunger portion is configured to be spaced from the first sealing surface in a second position thereby opening the flow path through the flow body, between the stepped plunger portion and the stepped body portion.

2. The apparatus of claim 1, wherein the plunger comprises a second cross-sectional shape corresponding to the first cross-sectional shape of the cavity.

3. The apparatus of claim 1, wherein the flow body further comprises an intake opening and an output opening.

4. The apparatus of claim 3, wherein the flow path comprises the intake opening, a portion of the cavity proximate an end of the plunger, and the output opening.

5. The apparatus of claim 1, further comprising an actuator, wherein the actuator is coupled with the rod and configured to longitudinally move the plunger within the cavity, between the first position and the second position.

6. The apparatus of claim 1, further comprising a manual interface coupled with the rod, wherein the manual interface is configured to facilitate positioning the plunger at the first position or the second position.

7. The apparatus of claim 1, further comprising a profile shape at an end of the plunger.

8. The apparatus of claim 7, wherein the profile shape comprises a cross-sectional shape of a circular portion, a square portion, a triangular portion, a pentagonal portion, a hexagonal portion, and a polygonal portion.

9. The apparatus of claim 1, further comprising a cap, wherein the cap is coupled with the flow body by a plurality of fasteners.

10. The apparatus of claim 1, further comprising a bolt, wherein the bolt is coupled with the flow body by a threaded connection, and the bolt comprises a rod opening.

11. The apparatus of claim 10, further comprising a seal between the flow body and the diaphragm.

12. The apparatus of claim 10, further comprising a bump seal between the flow body and the diaphragm.

13. The apparatus of claim 10, further comprising an adhesive between the flow body and the diaphragm.

14. The apparatus of claim 1, further comprising an actuation rod, wherein the actuation rod couples to the diaphragm.

15. The apparatus of claim 1, wherein the plunger tip is configured to deform.

16. The apparatus of claim 15, wherein the deformation of the plunger tip is configured to conform to a profile of the sealing surface.

17. The apparatus of claim 1, wherein the flow body is configured to pass a corrosive fluid therethrough.

18. The apparatus of claim 1, wherein the flow path extends between the plunger tip and the bottom of the cavity.

19. The apparatus of claim 1, wherein the plunger tip forms an orifice with the bottom of the cavity.

20. The apparatus of claim 1, wherein the stepped portion of the cavity extends radially outward and perpendicular with respect to the longitudinal axis of the cavity.

21. The apparatus of claim 1, further comprising a bump seal disposed between the stepped body portion and the stepped plunger portion.

* * * * *